UNITED STATES PATENT OFFICE.

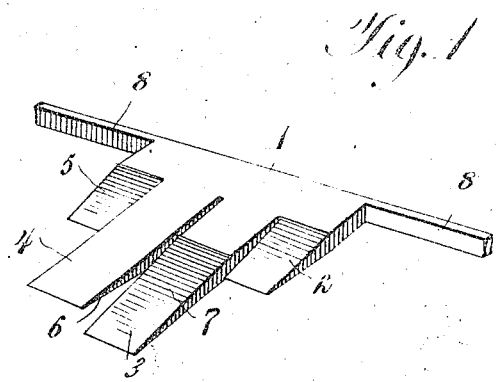
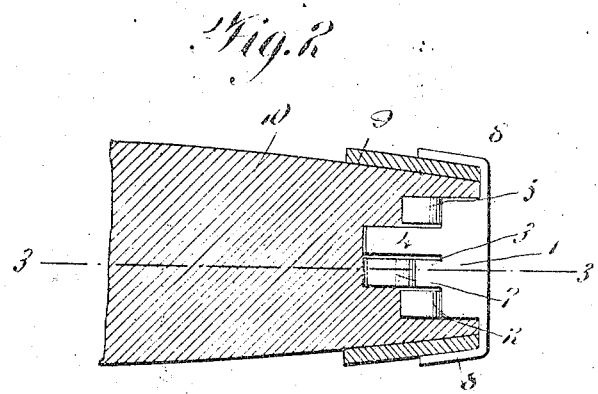
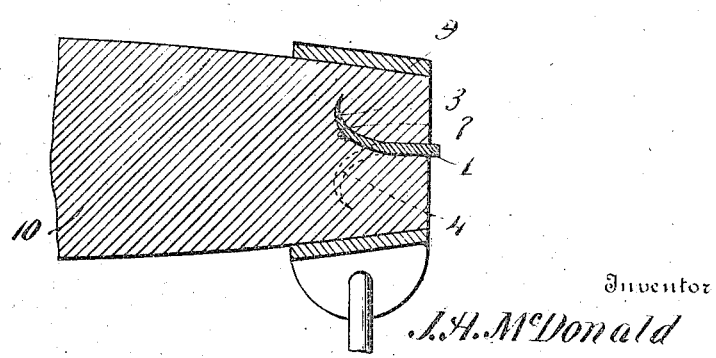

JAMES A. McDONALD, OF CARTER, OKLAHOMA.

WEDGE.

1,063,460.  Specification of Letters Patent.  Patented June 3, 1913.

Application filed March 1, 1912. Serial No. 680,814.

*To all whom it may concern:*

Be it known that I, JAMES A. McDONALD, a citizen of the United States, residing at Carter, in the county of Beckham and State of Oklahoma, have invented new and useful Improvements in Wedges, of which the following is a specification.

This invention relates to wedges and more particularly to that type which are adapted for spreading the ends of handles in tool heads or for spreading the ends of whiffle trees in the trace hooks or rings.

The principal object of the invention is to provide a wedge with a plurality of separate legs, certain of which legs will spread in opposite directions when driven into the wood so as to effectually prevent removal of the wedge.

A still further object of the invention is to provide a wedge of this character wherein the legs spread in opposite directions so as to prevent removal of the wedge and which wedge is provided with a malleable bar or strip adapted to be bent over the trace hook, ring, or the tool head, if found desirable.

Further objects of this invention will appear as the following specific description is read in connection with the accompanying drawing, which forms a part of this application, and in which:—

Figure 1 is a perspective view. Fig. 2 is a vertical sectional view through the end of a swingle tree showing a wedge arranged therein in side elevation. Fig. 3 is a horizontal section taken on the line 3—3 of Fig. 2.

Referring more particularly to the drawing, 1 represents the body of the device which has projecting therefrom a plurality of prongs 2, 3, 4 and 5, the first and the latter of which are tapered from the body to their terminals on opposite sides so as to form a straight wedge. The prongs 3 and 4 are sheared off on opposite sides, as shown at 6 and 7, so that when the wedge is driven into the wood these prongs will be caused to diverge, as shown in Fig. 3. This action may be caused by their shearing the prongs off, as shown, or by forming them in a similar manner to the prongs 2 and 5 and then bending them so that one side lies straight with the body 1. This would give exactly the same effect as shearing and it is preferred on account of its reduction in the expense of manufacture.

Extending outwardly from the ends of the body are arms 8 which are adapted to be bent over a whiffle tree ring which is shown at 9 driven on to the end of the swingle tree 10. These arms prevent disengagement of the hook ring even if the same should become loose upon the swingle tree by reason of shrinkage thereof.

What is claimed is:—

1. A device of the class described comprising a body, a plurality of wedge members extending from the body in the same general direction, the outside wedge members being tapered equally upon opposite sides and the inside wedge members being each tapered on one side only and from opposite sides, and malleable ferrule holding arms projecting in opposite directions from the body.

2. A device of the class described comprising a body, a pair of separated prongs extending outwardly from the body, said prongs being tapered on one side only and from opposite sides, a pair of prongs extending outwardly from the body and each tapered from opposite sides, and ferrule holding arms projecting in opposite directions from the body at right angles to the prongs.

In testimony whereof I affix my signature in presence of two witnesses.

JAMES A. McDONALD.

Witnesses:
  E. EDMONSTON, Jr.,
  F. O. PARKER.